April 2, 1940. C. M. SINCERBEAUX 2,195,760
DOOR CLOSING MECHANISM FOR AUTOMOBILES
Filed Dec. 2, 1935
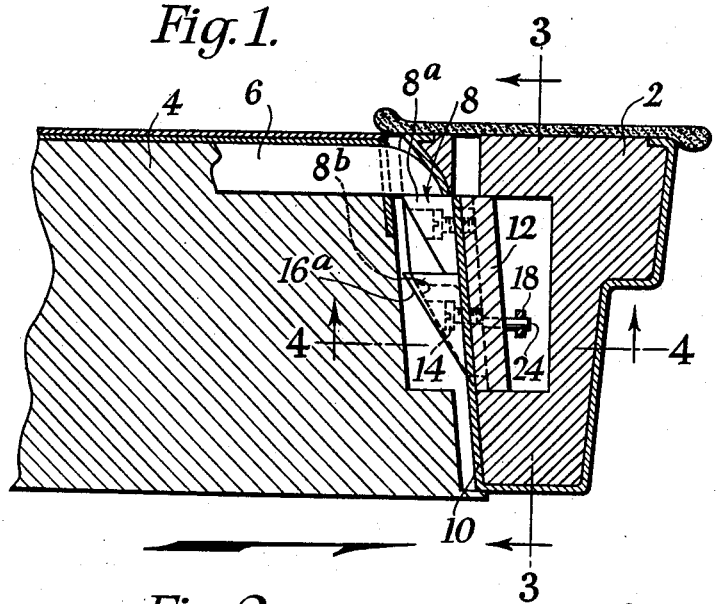
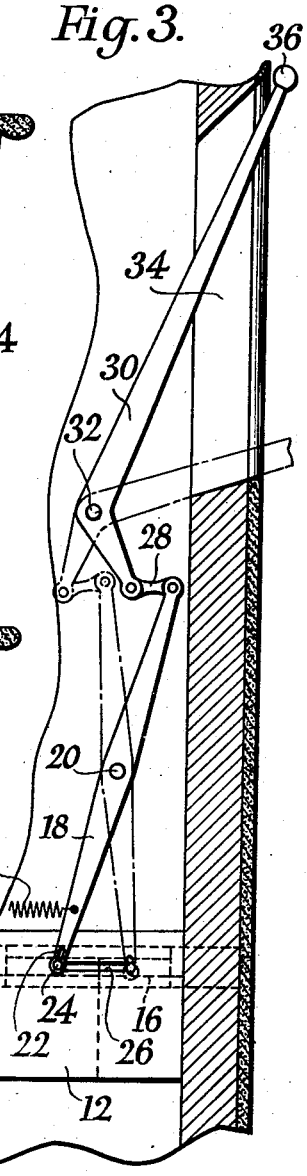
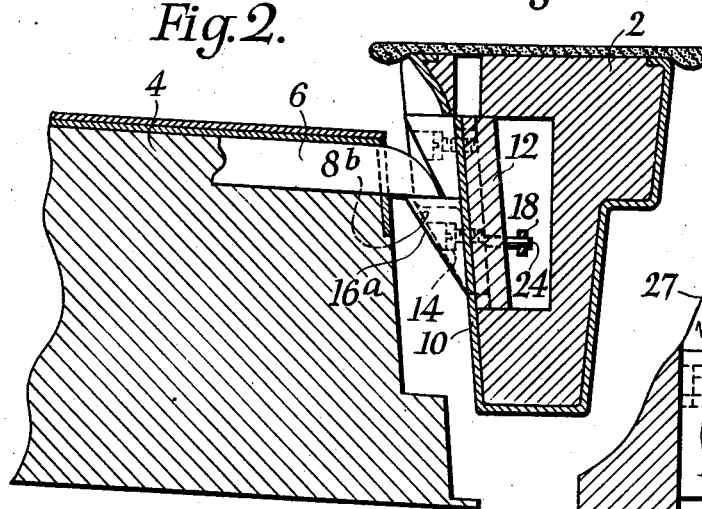
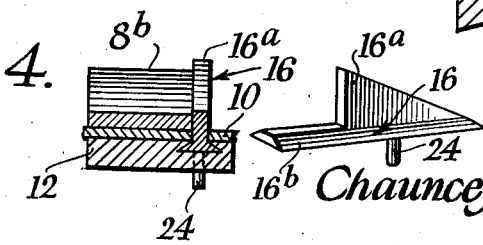
INVENTOR
Chauncey M. Sincerbeaux.

Patented Apr. 2, 1940

2,195,760

UNITED STATES PATENT OFFICE 2,195,760

DOOR CLOSING MECHANISM FOR AUTOMOBILES

Chauncey M. Sincerbeaux, Kew Gardens, N. Y.

Application December 2, 1935, Serial No. 52,513

7 Claims. (Cl. 292—340)

This invention relates to door actuating devices for moving the doors of automobiles from nearly closed to fully closed positions.

As is well known to those familiar with automobile doors and the latch mechanism therefor, when a door is closed, the latch bolt often is not carried inward toward the central part of the body far enough to engage inside the inner projection on the striker plate. With the door in this nearly closed position, when the automobile is running, objectionable rattles are produced by the engagement of the bolt with the outer projection on said plate. When this occurs, it is common practice for the driver or a passenger in the automobile to unlatch the door and swing it open and then slam it to fully closed position. This is dangerous, particularly when the door is hinged at its rear edge so that it swings toward the rear from closed to open position.

When an automobile, having a door hinged in this manner, is travelling at high speed and the door is unlatched and partially opened preparatory to slamming it, the air rushing past the automobile often catches the door and swings the same swiftly rearward. In this action, the person opening the door is sometimes pulled through the door opening by the rapidly opening door. A similar result may occur by reason of the rapid acceleration of the automobile during starting.

One object of the invention is to provide automobiles with a manually operable door closing mechanism by which the driver or a passenger may quickly and easily move a door from nearly closed to fully closed position.

Another object of the present invention is to produce a mechanism by which a door of an automobile may be readily moved manually from nearly closed to fully closed position without partially opening the door.

Another object of the invention is to produce mechanism for closing manually a door of an automobile which will enable the door to be moved from nearly closed to fully closed position while the latch bolt remains in control of the door.

With the above and other objects in view, the invention consists in the novel and improved features, constructions and combinations of parts hereinafter described and particularly pointed out in the claims, the advantages of which will be readily understood and appreciated by those skilled in the art.

The various features of the invention will be clearly understood from the accompanying drawing illustrating a construction embodying the invention in its preferred form and the following detailed description of the construction therein shown.

In the drawing, Fig. 1 is a view in horizontal section illustrating a portion of an automobile body embodying the invention and showing the door in closed position;

Fig. 2 is a view similar to Fig. 1 illustrating the door in nearly closed position;

Fig. 3 is a view in vertical section taken substantially on the line 3—3 of Fig. 1;

Fig. 4 is a detail view in vertical section taken substantially on the line 4—4 of Fig. 1, and Fig. 5 is a detail perspective view illustrating one of the parts of the door closing mechanism.

In the present application, the invention is illustrated as embodied in an automobile body construction comprising a center post 2 located between the forward and rear doors and a rear door 4 hinged at its rear edge and having its forward edge located with relation to the center post, as shown in Fig. 1, when the door is in fully closed position. The door is provided with the usual spring pressed latch bolt 6 which is constantly pressed yieldingly forward beyond the forward edge of the door by a suitable spring (not shown). The forward end of said bolt is arranged to engage a striker plate 8 mounted on the center post 2. The striker plate is provided with two spaced projections, 8a and 8b with which the forward end of the latch bolt engages, the bolt engaging the inner projection 8a in the manner shown in Fig. 1 when the door is in fully closed position.

The striker plate is secured to the metal sheathing 10 surrounding the center post. As clearly shown in the drawing, a backing block or plate 12 is located on the inner face of the sheathing 10 opposite the striker plate and the striker plate is secured in position by means of screws 14 passing through the sheathing and threaded into said plate.

The door closing mechanism comprises a member 16 having a triangular projection 16a located immediately above the striker plate and arranged to engage the forward end of the latch bolt. The said member is mounted for sliding movement in the direction of movement of the adjacent edge of the door. To this end, said member is provided with a dove-tailed portion 16b, engaging in a correspondingly shaped groove in the plate 12 as clearly shown in Fig. 4, the triangular projection 16a extending through a slot in the sheathing 10.

As shown in Figures 1 and 2, the projection 16a extends rearwardly somewhat beyond the projections on the striker plate. The member 16 normally occupies the position shown in Figures 1 and 2 with relation to the striker plate so that the inner face of the projection 16a is substantially flush with the corresponding face of the outer projection 8b on the striker plate.

Figure 2 shows the door in position with the forward end of the latch bolt engaging the outer projection on the striker plate. In order to move the door from this nearly closed to fully closed position, the member 16 is moved inwardly to carry the forward end of the bolt past the projection 8a on the striker plate so that the bolt will then spring forward into the position shown in Fig. 1.

The mechanism for thus moving the door from nearly closed to fully closed position comprises a lever 18 pivoted at 20 in a slot in the center post and having at its lower end a slot 22 in which engages a pin 24 projecting forwardly from the member 16. This pin passes through a suitable slot 26 in the block 12. A coiled spring 27 preferably is provided for maintaining the lever 18 and the member 16 normally substantially in the positions shown in the drawing. The upper end of the lever 18 is connected by a link 28 with a lever 30 pivoted at 32 on the center post and having its upper end extending through a slot 34 in said post to the inside of the body. This lever is provided with a handle or knob 36 accessible from inside the body which may be grasped by the operator in manipulating the lever. It will be noted that the lengths of the longer and shorter arms of the lever 30 are such as to give a great deal of leverage when the lever is actuated to move the member 16.

When the door is in nearly closed position, with the latch bolt in engagement with the outer projection on the striker plate, and it is desired to close fully the door, the knob 36 on the upper end of the lever 30 is grasped and the lever is swung manually into the position shown in dot and dash lines in Fig. 3. This manipulation of the lever will impart the movement to the member 16 required to swing the door inwardly to fully closed position. When the lever 30 is released the spring 27 will move the same and the member 16 back to the positions shown in the drawing.

With the above construction, the door may be readily moved from nearly closed to fully closed position without unlatching and partially opening the door with its attendant dangers. It will be noted that during the operation of the door closing mechanism, the latch bolt remains at all times in full control of the door so that the door cannot swing to partially open position.

While the invention has been illustrated for convenience in connection with the rear door of an automobile, it is to be understood that the invention is equally well applicable to the forward doors or to single side doors. The invention may, also, be employed in connection with doors which are hinged at their forward edges and has considerable advantage in connection with such doors.

The mechanism embodying the invention as illustrated in this application is simple in construction, inexpensive to manufacture and may be readily applied to automobiles of regular or standard construction.

It is to be understood that the invention is not limited to the particular construction and arrangement of parts of the illustrated embodiment of the invention, but that the construction shown and described is merely illustrative of the invention and that the invention may be embodied in other forms within the scope of the claims.

Having explained the nature and object of the invention and having specifically described a mechanism embodying the invention in its preferred form, what is claimed is:

1. In a construction for the bodies of automobiles having a body formed with a door opening and a hinged door for closing said opening, a spring pressed latch bolt for the door, a door closing device mounted on a portion of the body adjacent an edge of the door and arranged to engage the portion of the bolt projecting beyond the door when the door is adjacent closed position but not fully closed and an element operable manually to actuate said device and thereby the door bolt to close fully the door.

2. In a construction for the bodies of automobiles having a body provided with a door opening and a hinged door arranged to close said opening, a spring pressed latch bolt, a striker plate mounted on a portion of the body adjacent an edge of the door and engaged by the bolt when the door is in nearly closed and in fully closed position, a device movably mounted on said portion of the body adjacent the striker plate and arranged to engage the outer face of the projecting end of the bolt when the door is in nearly closed position and manually operable mechanism extending from said device to the inside of the body for actuating said device to move the door from nearly closed to fully closed position.

3. In a construction for the bodies of automobiles having a fixed body portion and a door hinged to the body portion, manually controlled mechanism for moving the door from nearly closed to fully closed position and means for restoring automatically said mechanism to its original condition after each door closing operation.

4. In a construction for the bodies of automobiles having a fixed body portion and a door movably mounted on the body portion, manually controlled mechanism for moving the door from nearly closed to fully closed position, constructed to allow the door to be freely opened and closed upon the release of said means.

5. In a construction for the bodies of automobiles having a fixed body portion and a door hinged to the body portion, a striker plate having two spaced projections, a latch bolt arranged to engage the outer projection when the door is nearly closed and to engage the inner projection when the door is fully closed, and mechanism comprising relatively movable operating parts and having a mechanical advantage greater than one for moving the door from a position in which the latch bolt engages the outer projection to a position in which said bolt engages the inner projection.

6. A construction for automobiles having a fixed body portion and a door hinged to the body portion, in combination, a striker plate having two spaced projections, a latch bolt arranged to engage the outer projection when the door is nearly closed and to engage the inner projection when the door is fully closed, and manually operable means for moving the door from a position in which the latch bolt engages the outer projection to a position in which said bolt engages the inner projection.

7. In a construction for the bodies of automobiles having a fixed body portion and a door hinged to the body portion, a striker plate having two spaced projections, a spring actuated latch bolt for the door arranged to engage the outer projection when the door is nearly closed and to engage the inner projection when the door is fully closed, and mechanism for moving the door from a position in which the latch bolt engages the outer projection to a position in which said bolt engages the inner projection constructed to allow the door to be freely opened and closed after each operation of said mechanism.

CHAUNCEY M. SINCERBEAUX.